United States Patent [19]

Morris

[11] Patent Number: 4,658,386

[45] Date of Patent: Apr. 14, 1987

[54] ULTRASONIC SOUND WAVE GENERATING DEVICE FOR REPELLING ANIMALS

[75] Inventor: Kenneth L. Morris, Pittsford, N.Y.

[73] Assignee: Mobil Oil Corporation, New York, N.Y.

[21] Appl. No.: 697,548

[22] Filed: Feb. 1, 1985

[51] Int. Cl.$^4$ .................. H04B 1/02; G08B 13/00; G08B 23/00

[52] U.S. Cl. .................................. 367/139; 340/565; 340/573

[58] Field of Search ................. 367/139, 136, 112; 250/349; 43/120, 143; 340/565–567, 573, 384 E

[56] References Cited

U.S. PATENT DOCUMENTS

| | | |
|---|---|---|
| 2,922,999 | 1/1960 | Carlin . |
| 3,138,138 | 11/1961 | Quittner . |
| 3,188,999 | 6/1965 | Baxter . |
| 3,277,861 | 10/1966 | Moe . |
| 3,522,791 | 8/1970 | Feller . |
| 3,599,745 | 8/1971 | Hughes . |
| 3,656,141 | 4/1972 | Hill .................................. 340/573 |
| 3,760,399 | 9/1973 | Schwarz . |
| 3,792,275 | 2/1974 | Leftwich et al. . |
| 3,872,472 | 3/1975 | Moschgat ..................... 367/139 |
| 3,963,927 | 6/1976 | Bruce et al. . |
| 4,087,688 | 5/1978 | Keller . |
| 4,188,622 | 2/1980 | Miller et al. ..................... 340/573 |
| 4,271,358 | 6/1981 | Schwarz . |
| 4,282,412 | 8/1981 | Florin . |
| 4,284,845 | 8/1981 | Belcher . |
| 4,434,337 | 2/1984 | Becker . |
| 4,459,689 | 7/1984 | Biber .............................. 367/112 |

Primary Examiner—Theodore M. Blum
Assistant Examiner—Gregory C. Issing
Attorney, Agent, or Firm—Alexander J. McKillop; Michael G. Gilman; Charles J. Speciale

[57] ABSTRACT

A device for repelling animals is disclosed which is adapted for use with refuse and garbage containers to discourage entry therein by foraging animals. The device comprises:
(a) a detector for remote-sensing the presence of an animal within its vicinity;
(b) an ultrasonic sound generator for producing an animal-repelling ultrasonic sound wave; and
(c) means for temporarily activating the ultrasonic sound generator when the detector has sensed the presence of an animal within its vicinity.

4 Claims, 3 Drawing Figures

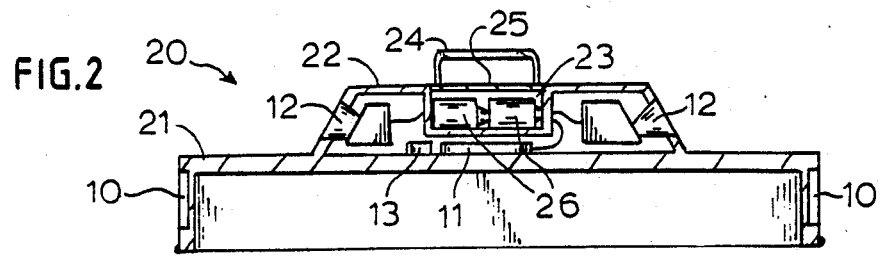
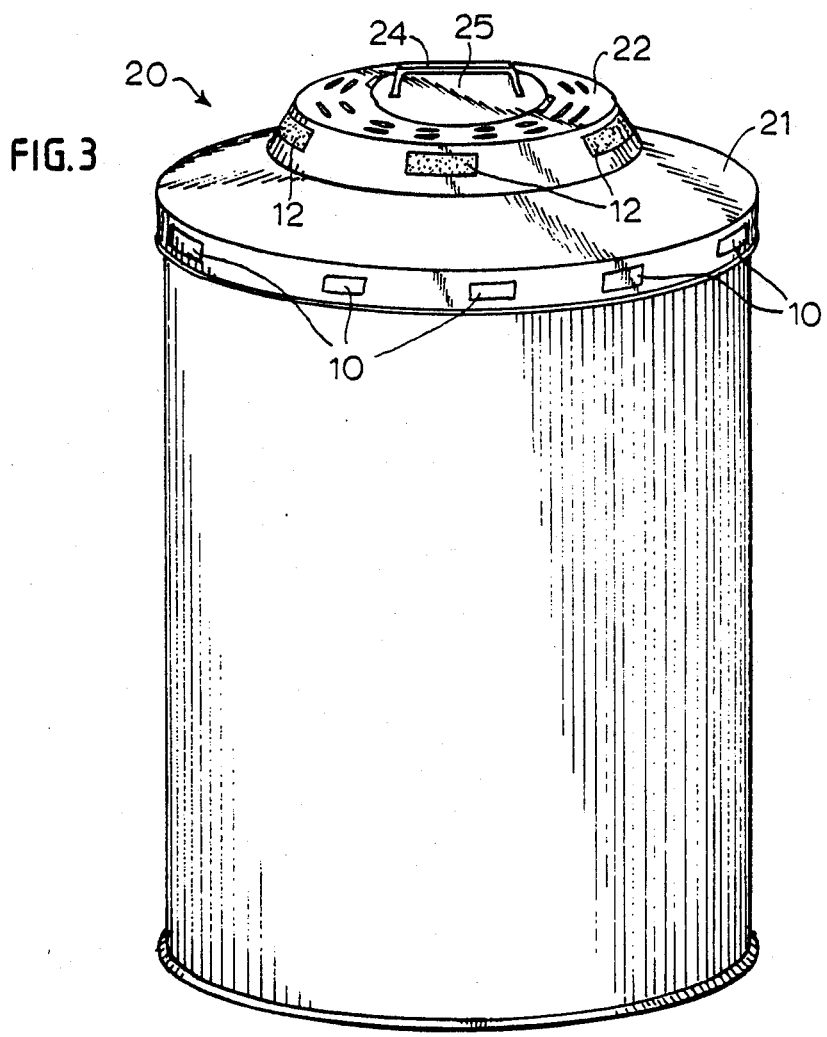
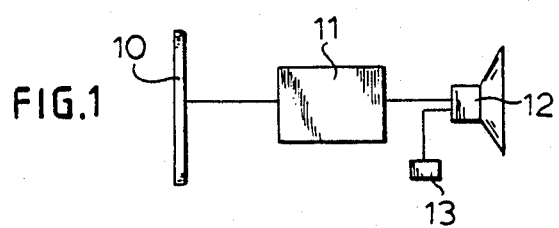

ULTRASONIC SOUND WAVE GENERATING DEVICE FOR REPELLING ANIMALS

BACKGROUND OF THE INVENTION

The present invention relates to an ultrasonic sound wave generating device and, in particular, to such a device especially adapted for repelling animals.

Devices for generating ultrasonic sound waves which are inaudible to man but within the audible range of many kinds of animals are well known. Typically, these devices are employed for the purpose of repelling pest animals such as insects, birds, small mammals such as mice, bats, rats, etc., from a particular site, for example, a place where foodstuffs are grown or stored, and from discouraging them from intruding upon, gaining access to, or occupying the site. Illustrative of such devices are those disclosed in U.S. Pat. Nos. 2,922,999; 3,138,138; 3,188,999; 3,277,861; 3,522,791; and 4,284,845, the contents of which are incorporated by reference herein.

Devices for the detection of a moving human intruder which remote-senses the infra-red radiation emitted by the intruder when the intruder has come within the infra-red radiation-sensing range of the devices are also known. Several of these devices feature means for activating an alarm which is audible to the human ear when the infra-red radiation detector has sensed the presence of an intruder. Illustrative of such devices are those disclosed in U.S. Pat. Nos. 3,760,399; 3,792,275; 4,087,688; and, 4,271,358, the contents of which are incorporated by reference herein.

Another remote sensing device which operates upon an entirely different detection principle is the carbon dioxide measurement apparatus of U.S. Pat. No. 3,963,927 the contents of which are incorporated herein. While the device is primarily designed to detect hidden insects, with appropriate modification, it could also be used to detect larger animals from a distance.

Devices which trigger a signal or switch upon sensing a disturbance are also known. Thus the gravity switching device of U.S. Pat. No. 3,599,745, the contents of which are incorporated by reference herein, can sense when a tractor or other machine is tilted to an unsafe operating position whereupon a switch will interrupt the flow of fuel to the engine or cut off the ignition. U.S. Pat. No. 4,434,337, the contents of which are also incorporated by reference herein describes a mercury switch which is activated by a tilting movement.

None of the foregoing patents disclose or suggest an animal-repelling ultrasonic sound wave generating device which is temporarily activated when a detector, for example, an infra-red radiation detector, has sensed the presence of an animal intruder within its vicinity.

SUMMARY OF THE INVENTION

In accordance with the present invention, a device for repelling animals and discouraging animals from intruding upon a particular site is provided which comprises:

(a) a detector for remote-sensing the presence of an animal within its vicinity;

(b) an ultrasonic generator for producing an animal-repelling ultrasonic sound wave; and, (c) means for temporarily activating the ultrasonic sound generator when the sensor has detected the presence of an animal within its vicinity.

The device can be fixed in place and draw on any source of utility current for its relatively modest power needs or it can be entirely portable with its own self-contained power source, e.g., a rechargeable or non-rechargeable battery. The latter embodiment is entirely suitable for combination with a refuse or garbage container to repel pest animals which would attempt to gain access thereto.

Since the animal-repelling sound wave is inaudible to the human ear, activation of the ultrasonic sound generator by the presence of humans within the sensing range of the detector is of no consequence beyond considerations of power drainage. In any event, in a preferred embodiment of the device of this invention, the detector can be provided as an infra-red radiation detector, for example, a thermopile detector, which is insensitive to infra-red radiation of wavelengths characteristic of humans but which is sensitive to infra-red wavelengths characteristic of those pest animals to be repelled.

BRIEF DESCRIPTION OF THE DRAWING

FIG. 1 is a schematic representation of an ultrasonic sound wave generating device for repelling animals in accordance with the present invention;

FIG. 2 is a schematic front elevational view of one such device of a fully portable, self-contained type, combined with the cover or lid unit which is capable of being fitted to the receptacle unit of a refuse or garbage container of otherwise conventional design and structure; and, FIG. 3 is a perpetual view of a refuse or garbage container fitted with a lid unit having an animal repelling device in accordance with this invention mounted thereon.

DESCRIPTION OF THE PREFERRED EMBODIMENTS

In accordance with FIG. 1, signals from an infra-red detecting surface 10 such as a thermopile detector are applied to an electronic logic module 11 of known and conventional type which serves to amplify the signals and distinguish them from unwanted signals. Electronic logic module 11 then applies the desired signals to temporarily activate ultrasonic sound generator 12, for example, of the electro-mechanical type shown in U.S. Pat. No. 4,284,845 or the fluid-pressure driven types shown in U.S. Pat. Nos. 3,138,138; 3,188,999; and 3,522,791, all of which have been mentioned above. The frequency of the ultrasonic sound emanating from ultrasonic sound wave generator 12 is advantageously adjustable to provide the most effective animal-repelling sound for a given situation. Electronic logic module 11 also contains a conventional type timing circuit which controls the duration of the output of ultrasonic sound generator 12 when the latter is activated. In a preferred embodiment, the timing circuit can be adjusted to provide ultrasonic sound outputs of longer or shorter duration as desired.

Both the sensitivity of infra-red detecting surface 10 and its ability to discriminate between different wavelengths of infra-red radiation can be adjusted, if desired, by a variety of conventional means. Since the sensitivity of surface 10 is proportionate to its surface area, it is a simple enough matter to provide a more or less greater surface area depending upon the detecting range desired.

In general, a detecting range of from four to ten feet or so is adequate for most situations. The amplification settings for electronic logic module 11 can also be adjusted to process only those signals which are characteristic of a particular type of pest animal.

One type of thermopile detector which can be advantageously used in the device of this invention is that described in U.S. Pat. No. 3,792,275 referred to supra. The detector is formed of a series of dissimilar metals such as bismuth and antimony forming junctions therebetween. The detector is advantageously blackened to increase its sensitivity to infra-red radiation. The thermocouple junctions are formed on a substrate of a thin insulating material, such as polyethylene terephthalate of other suitable material which is a good insulator and lends itself to deposit of metal thereon by evaporation techniques. The construction of the thermopile is formed using conventional vacuum evaporation techniques on the substrate, and its construction differs from conventional thermopile construction in that all of the junctions are active, there being no reference junctions. With this construction, alternating polarities are set up across the row of thermocouples, and the thermopile is arranged in 10 columns, one through ten, with each thermocouple in its respective column being of the same polarity. All of the thermocouple junctions are serially connected between two output terminals and with the rows being interconnected serially by a connector pad. Terminal pads are connected via leads to feed-through pins. With this type of construction, an animal moving across columns 1–10 will generate alternative positive and negative signals across the output leads which can be processed to detect the presence of the animal.

If desired, a secondary means 13 for triggering the temporary operation of ultrasonic sound generator 12 can be provided, for example in the form of the gravity switching device of U.S. Pat. No. 3,599,745 or the mercury switch of U.S. Pat. No. 4,434,337 referred to above.

While a suitably modified carbon dioxide measurement apparatus as shown in U.S. Pat. No. 3,963,927, supra, can be used to provide the detector component of this invention, it is a comparatively complicated and expensive device and as such would be inappropriate where manufacture of a low cost, mass-marketed animal repelling device is desired.

In accordance with the embodiment shown in FIGS. 2 and 3, a circular lid unit 20 of a refuse or garbage container which has been modified to receive an animal-repelling device in accordance with this invention is provided with a plurality of infra-red radiation detecting elements 10 of the type described.These detector elements are positioned about, and recessed within, rim 21 at approximately equal intervals along the entire circumference of the rim. The detectors are curved to complement the curvature of the rim of the lid. Circular housing 22 mounted upon lid 20 contains a battery storage compartment 23 access to which is gained by slightly shifting integrally formed handle 24 and battery compartment cover 25 so as to displace, and thereby disengage, tabs positioned at each end of the cover from their retaining slots (not shown). Standard size rechargeable or non-rechargeable batteries 26 together with their associated electrical connectors are disposed within compartment 23 providing the power needs for electronic logic module 11 and ultrasonic sound generators 12 which are advantageously of the electromechanical type. Leads are provided connecting infra-red radiation detecting elements 10 with electronic logic module 11, ultrasonic generators 12 and batteries 26 in an operational circuit, preferably provided with a cut-off switch. A mercury switch 13 to activate ultrasonic sound generators 12 can also be incorporated into the circuit to provide a secondary detection means which will register any significant disturbance or change in the inclination of the garbage container and so serve as a back-up to the primary detector unit.

In the embodiment of the invention shown in FIGS. 2 and 3, each of the infra-red detection units 10 is separately connected to a corresponding ultrasonic sound generator 12 which concentrates its output in an outward direction so that an animal approaching the container from, say, a generally southerly direction will trigger or activate the operation of the corresponding southerly oriented ultrasonic generator. This arrangement, while perhaps the most effective and efficient, is also the most expensive to implement from a manufacturing cost standpoint. For the purpose of reducing cost, but at some loss of ultrasonic sound wave impact, a single centrally located ultrasonic generator which directs its output directly upward and which can be activated by signals generated by any of infra-red radiation detectors 10 can be provided in place of the plurality of ultrasonic sound generators 12 shown.

It will be understood that the above description of the present invention is susceptible to various modifications, changes and adaptation, and the same are intended to be comprehended within the meaning and range of equivalents of the appended claims.

What is claimed is:

1. In a refuse container of the type which includes a receptacle and a lid removably fitted to the receptacle, a device carried in the container and operable for repelling animals present in the vicinity of the container location, the device comprising as components embodied in the lid
   (a) a detector for remote-sensing infra-red radiation emitted by an animal present within its infra-red radiation sensing range, said detector including a plurality of detecting elements received in the lid at the circumference thereof and disposed in spaced array about said circumference;
   (b) ultrasonic sound generator means for producing an animal-repelling ultrasonic soundwave; and
   (c) means for temporarily activating the ultrasonic sound generator when presence of an animal is sensed by any of the detecting elements.

2. The refuse container of claim 1, in which the sound generator means comprises a plurality of ultrasonic sound generators arrayed in like correspondence with the plurality of detecting elements, each detecting element being connected to a corresponding sound generator whereby the output from an activated sound generator is in the direction from which animal emitted radiation was detected.

3. The refuse container of claim 1, in which the container lid has a circular circumferential rim, the detecting elements being recessed in the rim and configured with curvature to complement that of said rim.

4. The refuse container of claim 1, which further comprises a secondary detector for detecting disturbance of said container by one of tilt thereof and lid removal therefrom, said secondary detector being operable to temporarily activate the ultrasonic sound generator.

* * * * *